(No Model.)

G. E. H. LÜTTSCHWAGER.
Churn.

No. 232,138. Patented Sept. 14, 1880.

Witnesses:
Fred G. Dieterich
Albert H. C. Krause

Inventor:
Gustav E. H. Lüttschwager
Per La Fayette Bingham & Co.
Attorneys

UNITED STATES PATENT OFFICE.

GUSTAV E. H. LÜTTSCHWAGER, OF BUCKEYE TOWNSHIP, (COTTAGE HILL P. O.,) HARDIN COUNTY, IOWA.

CHURN.

SPECIFICATION forming part of Letters Patent No. 232,138, dated September 14, 1880.

Application filed May 4, 1880. (No model.)

*To all whom it may concern:*

Be it known that I, GUSTAV E. H. LÜTTSCHWAGER, of Buckeye township, in the county of Hardin and State of Iowa, have invented certain new and useful Improvements in Churns; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
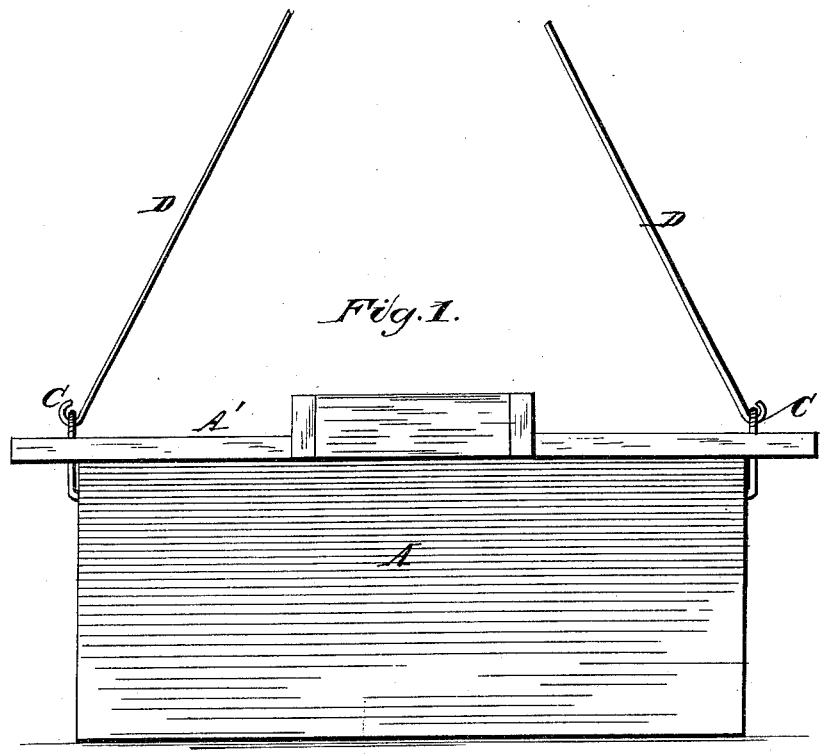
Figure 2:
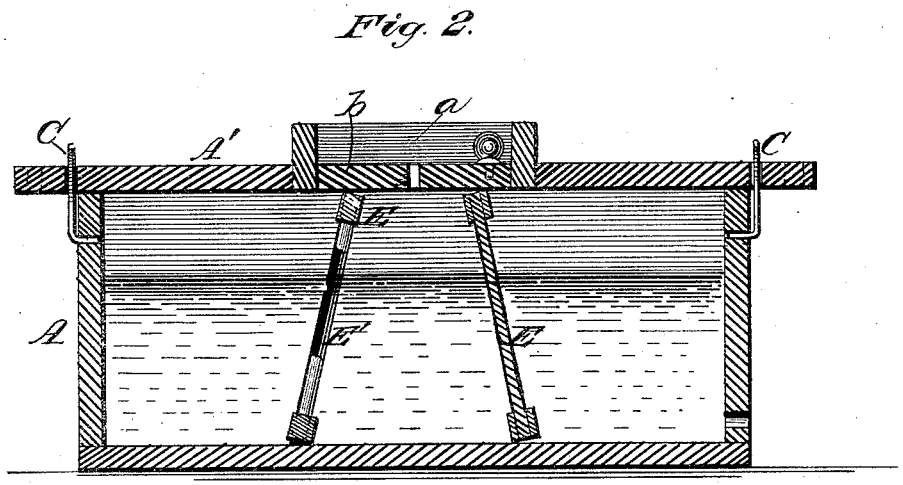

Figure 1 is a side view of my improved churn, and Fig. 2 is a longitudinal section of the same.

This invention has relation to improvements in oscillating churns; and it consists of a suspended swinging vessel or receptacle, its suspending-rods being suitably secured or pivoted to an elevated point and connected to ears on the receptacle, combined with relatively-fixed slatted beaters or breakers, substantially as hereinafter more fully set forth.

Referring to the drawings hereto annexed, A indicates the cream receptacle or vessel, preferably rectangular in shape, and having a cover, A', with a central flanged opening, a, which is closed by a lid, b. C C are ears in the form of staples, with their vertical portions extending up through and serving to hold the cover A' upon the receptacle, while their horizontal or right-angled portions are inserted into the ends of the receptacle. D D are the rods for suspending the vessel or receptacle A in position so as to be susceptible of an oscillatory or swinging motion, with their lower ends hooked in the ears C C of the receptacle A, while their upper ends are designed to be pivoted or hung in the ceiling or other elevated point suitable for the purpose.

E E are the beaters or breakers slid in the receptacle transversely to its length about at its middle, with their lower ends diverging from each other and resting on the bottom of the receptacle. These breakers or beaters are fixed with relation to the action of the vessel, so that the action of the vessel thrusts the cream or its contents against the breakers, the friction between which effects the conversion of the cream into butter. These breakers consist each of a series of octagonal slats or bars, E', to give greater frictional surface of contact between the cream and breakers.

Having thus fully described my invention, I claim and desire to secure by Letters Patent—

The herein-described churn, composed of the receptacle or vessel A, having the cover A', ears C C, with their right-angled portions entering the end of the receptacle and their vertical portions extending up through the cover, rods D, suitably hung in position and with their lower ends hooked into the ears C C, and breakers or beaters E, slid in the receptacle A and fixed with relation to the oscillatory action of the receptacle, substantially as and for the purpose specified.

In testimony that I claim the foregoing as my own I affix my signature in presence of two witnesses.

GUSTAV E. H. LÜTTSCHWAGER.

Witnesses:
O. W. GARRISON,
M. VAN BURKITT.